US012577115B2

(12) United States Patent
Guo et al.

(10) Patent No.: US 12,577,115 B2
(45) Date of Patent: Mar. 17, 2026

(54) PROCESS FOR PRODUCING ALUMINA AND A LITHIUM SALT

(71) Applicant: Tianqi Lithium Kwinana Pty Ltd, Western Australia (AU)

(72) Inventors: Yafeng Guo, Western Australia (AU); Hazel Lim, Western Australia (AU)

(73) Assignee: Tianqi Lithium Kwinana Pty Ltd, Western Australia (AU)

( * ) Notice: Subject to any disclaimer, the term of this patent is extended or adjusted under 35 U.S.C. 154(b) by 727 days.

(21) Appl. No.: 17/759,077

(22) PCT Filed: Jan. 19, 2021

(86) PCT No.: PCT/AU2021/050029
§ 371 (c)(1),
(2) Date: Jul. 19, 2022

(87) PCT Pub. No.: WO2021/146768
PCT Pub. Date: Jul. 29, 2021

(65) Prior Publication Data
US 2023/0040892 A1 Feb. 9, 2023

(30) Foreign Application Priority Data
Jan. 20, 2020 (AU) ................................ 2020900144

(51) Int. Cl.
*C01B 39/02* (2006.01)
*C01B 33/12* (2006.01)
(Continued)

(52) U.S. Cl.
CPC ............ *C01B 39/02* (2013.01); *C01B 33/126* (2013.01); *C01D 15/02* (2013.01); *C01D 15/06* (2013.01);
(Continued)

(58) Field of Classification Search
CPC ....... C01B 39/02; C01B 33/126; C01D 15/02; C01D 15/06; C01D 15/08; C01F 7/22;
(Continued)

(56) References Cited

U.S. PATENT DOCUMENTS

| 1,843,006 | A | 1/1932 | Stevens et al. |
| 2,516,109 | A | 7/1950 | Ellestad |

(Continued)

FOREIGN PATENT DOCUMENTS

| CN | 1486931 | A | * | 4/2004 |
| CN | 102502729 | A | | 6/2012 |

(Continued)

OTHER PUBLICATIONS

CN-1486931-A_Machine Translation (Year: 2004).*

(Continued)

*Primary Examiner* — Coris Fung
(74) *Attorney, Agent, or Firm* — Servilla Whitney LLC

(57) ABSTRACT

A process for producing alumina and a lithium salt comprising the steps of: (a) calcining an alpha spodumene ore or concentrate to produce beta spodumene; and (b) (I) leaching beta spodumene from the calcining step (a) with an alkaline solution under pressure; or (II) sulphating beta spodumene with at least sodium sulphate and leaching said sulphated beta spodumene to produce a lithium containing solution and a zeolitic residue. The lithium containing solution is treated to provide a purified lithium salt and said zeolitic residue is treated to provide high purity alumina.

20 Claims, 2 Drawing Sheets

(51) Int. Cl.

| | | |
|---|---|---|
| *C01D 15/02* | (2006.01) | |
| *C01D 15/06* | (2006.01) | |
| *C01F 7/22* | (2006.01) | |
| *C01F 7/306* | (2022.01) | |
| *C01F 7/441* | (2022.01) | |
| *C01F 7/56* | (2022.01) | |

(52) U.S. Cl.
CPC ................ *C01F 7/22* (2013.01); *C01F 7/306* (2013.01); *C01F 7/441* (2013.01); *C01F 7/56* (2013.01)

(58) Field of Classification Search
CPC .. C01F 7/306; C01F 7/441; C01F 7/56; Y02P 10/20; C22B 1/02; C22B 3/12; C22B 3/04
See application file for complete search history.

(56) References Cited

U.S. PATENT DOCUMENTS

| | | | |
|---|---|---|---|
| 2,793,933 | A | 5/1957 | Kroll et al. |
| 3,112,170 | A | 11/1963 | Archambault et al. |
| 3,131,022 | A | 4/1964 | Archambault |
| 4,158,042 | A | 6/1979 | Deutschman |
| 6,132,773 | A | 10/2000 | Amiche |
| 6,309,615 | B1 | 10/2001 | Hollitt et al. |
| 7,871,583 | B2 | 1/2011 | Jinguo et al. |
| 9,028,789 | B2 | 5/2015 | Correia |
| 9,517,944 | B2 | 12/2016 | Senyuta et al. |
| 2016/0273070 | A1 | 9/2016 | Boudreault et al. |
| 2018/0016153 | A1 | 1/2018 | Sharma |
| 2021/0032724 | A1 | 2/2021 | Maree et al. |
| 2022/0169521 | A1 | 6/2022 | Sharma |

FOREIGN PATENT DOCUMENTS

| | | | |
|---|---|---|---|
| CN | 105130223 A | | 12/2015 |
| CN | 105271317 A | | 1/2016 |
| CN | 107089674 A | * | 8/2017 |
| CN | 107815557 A | | 3/2018 |
| GB | 1082250 A | | 9/1967 |
| GB | 2205558 A | | 12/1988 |
| JP | S45040641 | | 12/1970 |
| KR | 20050045403 A | | 5/2005 |
| WO | 9722554 A1 | | 6/1997 |
| WO | 9908959 A1 | | 2/1999 |
| WO | 2007016326 A1 | | 2/2007 |
| WO | 2014075173 A1 | | 5/2014 |
| WO | 2016119003 A1 | | 8/2016 |
| WO | 2019148233 A1 | | 8/2019 |

OTHER PUBLICATIONS

CN-107089674-A_Machine Translation (Year: 2017).*

Kuang, GE, et al., "Recovery of aluminium and lithium from gypsum residue obtained in the process of lithium extraction from lepidolite", Hydrometallurgy, vol. 157, Oct. 2015, pp. 214-218.

"PCT International Search Report and Written Opinion in PCT/AU2021/050029 dated Mar. 9, 2021, 15 pages".

Chaoyang, Li , et al., "Experimental Study on Leaching Silicon and Aluminum from Fly Ash in Alkaline Solution at Low Temperature", Shandong Chemical Industry, 36-38, 2017.

Gonzalo-Delgado, L. , et al., "Recycling of Hazardous Waste From Tertiary Aluminium Industry in a Value-Added Material", Waste Management & Research: The Journal for a Sustainable Circular Economy, 2011, vol. 29, pp. 127-134; URL <https://doi.org/10.1177/0734242X10378330>.

Kuang, G. , et al., "Extraction of Lithium from β-Spodumene using Sodium Sulfate Solution", Hydrometallurgy, 2018, vol. 177; pp. 49-56.

Lopez-Delgado, A. , et al., "Synthesis of a-Alumina From a Less Common Raw Material", Journal of Sol-Gel Science and Technology, 2012, vol. 64, pp. 162-169; URL: <https://doi.org/10.1007/s10971-012-2843-2>.

Padilla, I. , et al., "Effects of Different Raw Materials in the Synthesis of Boehmite and y- and a-Alumina", Journal of Chemistry, 2016, vol. 2016, Article ID 5353490, pp. 1-6. URL: <https://doi.org/10.1155/2016/5353490>.

* cited by examiner

PROCESS FOR PRODUCING ALUMINA AND A LITHIUM SALT

CROSS REFERENCE TO RELATED APPLICATIONS

This is a National Phase entry of International Application No. PCT/AU2021/050029, filed Jan. 19, 2021, which claims priority to Australian Patent Application No. 2020900144, filed Jan. 20, 2020, the disclosures of which are incorporated herein by reference in their entireties.

TECHNICAL FIELD

The invention relates to a process for producing alumina and a lithium salt from beta or β-spodumene formed by calcination of a spodumene ore or concentrate.

BACKGROUND ART

The following discussion of the background art is intended to facilitate an understanding of the present invention only. The discussion is not an acknowledgement or admission that any of the material referred to is or was part of the common general knowledge as at the priority date of the application.

A range of processes are available for producing lithium salts of high purity for use in electric batteries. Key lithium salts for use in batteries include lithium hydroxide monohydrate and lithium carbonate.

A much-used process is a sulphuric acid leach in which a lithium ore, such as spodumene, is calcined and/or roasted and leached to form a lithium sulphate solution which is then treated to provide either lithium hydroxide monohydrate or lithium carbonate by precipitation. While this process is efficient, resulting in 90% or more lithium extraction, it has disadvantages. A significant amount of lime or other neutralising agent, such as sodium hydroxide or caustic soda, is required to neutralise excess sulphuric acid and the process also produces a significant amount of sodium sulphate.

Alternative processes for treatment of spodumene include chlorination roasting, hydrofluoric acid leaching and sodium carbonate leaching. However, these processes suffer from complexity and/or the use of toxic reagents.

Kuang et al., Extraction of lithium from β-spodumene using sodium sulphate solution, *Hydrometallurgy*, 177, (2018), 49-56, discloses a closed-loop process for the extraction of lithium from β-spodumene by leaching with sodium sulphate, a by-product of the lithium salt precipitation process. Two kinds of additives (CaO and NaOH) were employed to enhance extraction effect over a temperature range of 150 to 230° C. The lithium extraction efficiencies were recorded to be 93.30% with CaO addition and 90.70% with NaOH addition.

Australian Patent No. 2010341402 discloses a process for the production of lithium carbonate including the step of sulphating β-spodumene and passing sulphated β-spodumene to a leach step involving contacting of β-spodumene with sodium sulphate solution in leach tanks. Lithium carbonate is produced after treatment to remove impurities, such as Ca and Mg, and crystallisation. As this process involves sulphation of spodumene, it includes at least some deficiencies of the sulphuric acid roasting process.

Chinese Patent Application No. 107815557A discloses a process for extracting lithium from β-spodumene by contacting with sodium sulphate in a plug reactor. There is no mechanical stirring device in the plug reactor.

The present invention seeks to improve on the lithium extraction processes of the prior art and in a manner which improves the economics of the lithium extraction industry through efficient use of reagents and production of lithium and other values, particularly alumina, from spodumene ore which—by its nature as a lithium aluminium silicate—also contains aluminium and silicon.

SUMMARY OF INVENTION

The present invention provides, in one embodiment, a process for producing alumina and a lithium salt comprising the steps of:
- (a) calcining an alpha spodumene ore or concentrate to produce beta spodumene; and
- (b) (I) leaching beta spodumene from the calcining step
    - (a) with an alkaline solution under pressure; or
    - (II) sulphating beta spodumene with at least sodium sulphate and leaching said sulphated beta spodumene to produce a lithium containing solution and a zeolitic residue wherein said lithium containing solution is treated to provide a purified lithium salt and said zeolitic residue is treated to provide alumina.

The calcining step advantageously avoids sulphation with sulphuric acid alone, with an alkaline leach being adopted as one option in preference to an acid leaching scheme. Preferred alkaline solutions for the leach step are desirably selected from alkalised sodium sulphate solution, which is not usually in this case a by-product of a sulphuric acid leaching process, and sodium carbonate. A further alkali is also preferably introduced to a sodium carbonate solution to enhance leach efficiency. Options for the further alkali include NaOH and CaO with NaOH being favoured in this step—despite some association with lower lithium extractions—as avoiding introduction of a Ca impurity into the process and a necessary purification step to remove it. This simplifies the process. Advantageously, Glauber's salt ($Na_2SO_4.10H_2O$) could be used in preference to alkalised anhydrous sodium sulphate as a solution of Glauber's salt, particularly in the case where it is recycled from a lithium hydroxide production step, as described below, may already be in the alkaline pH range, reducing the requirement for alkali addition and offering a cost advantage.

Leaching is desirably a hydrothermal synthesis of beta spodumene (β-spodumene) having a selected particle size distribution. β-spodumene may be milled after calcination, to achieve the selected particle size distribution of, preferably, less than 100 μm.

Leaching is preferably conducted under pressure in the range of 5-45 bar, preferably 10-20 bar, and a temperature in the range of 100-300° C., preferably 150-230° C. Solids density is preferably in the range of 10-30% and residence time is preferably in the range of 2-12 hours (h), preferably 2-6 h. Desirably, in an alkaline sodium sulphate leach, where sodium sulphate and an alkali such as NaOH are in admixture, sodium sulphate is provided at 25 wt % to 60 wt % and NaOH flux at 2 to 10 wt % of that of the weight of the β-spodumene.

An alternative scheme would involve sulphating beta spodumene with solid sodium sulphate, which may be in admixture with another sulphate or acid, such as sulphuric acid, to produce solid lithium sulphate which may then be leached into lithium sulphate solution by an aqueous solution, for example an aqueous acidic solution or water.

The process integrates production of a lithium salt with production of alumina, preferably high purity alumina (HPA). The process may also allow recovery of a zeolitic material, such as hydroxy sodalite or analcime, or silica. These products have value and may be used in a range of applications though further treatment as described below is desirable to improve value.

The process may include further steps to produce any desired lithium salt, with lithium hydroxide and lithium carbonate being most preferred. The process includes steps to purify the lithium containing solution from the leaching step, which may require concentration prior to purification step(s) to remove impurities such as iron, silicon, calcium, potassium and magnesium. Preferably, calcium is not deliberately introduced as an added impurity to lithium salt production—for example by avoiding use of CaO as a neutralising agent. A preferred concentration operation involves evaporation. A preferred purification operation involves ion exchange, which is preferably preceded by a polishing filtration to enhance ion exchange efficiency. However, these examples of unit operations are not intended to be limiting and precipitation could, for example, be used as a purification operation.

The process may produce lithium hydroxide solution as an intermediate, the initial lithium containing solution from leaching step (b) being reacted with an alkali, preferably sodium hydroxide to avoid introduction of a calcium impurity, to produce lithium hydroxide if required. The lithium hydroxide solution is conveniently purified by crystallisation step(s) to produce lithium hydroxide monohydrate as a final product which may be used for lithium ion battery (LIB) manufacture. If lithium carbonate is to be formed as a final product, the intermediate lithium hydroxide solution is treated by carbonation, such as by carbon dioxide.

Where an alkaline solution of sodium sulphate is used in the leaching step, sodium sulphate may be regenerated by contacting the lithium sulphate leaching solution with sodium hydroxide to produce a lithium hydroxide solution and sodium sulphate. Sodium sulphate may be crystallised, including as Glauber salt ($NaSO_4.10H_2O$) and dissolved in water or alkaline solution (if required as recovered Glauber salt solution from lithium salt production steps may already be in an acceptable alkaline pH range) to be re-used in the leaching step.

As discussed above, the leaching step (b) produces a zeolitic residue, such as analcime and/or hydroxy sodalite, which is separated—either following cooling to ambient temperature or higher—by thickening or other separation operation. While this zeolitic residue may have some value as a final product, the separated zeolitic residue is desirably further treated to produce alumina, preferably high purity alumina, as a high value product.

Conveniently, the aluminium containing zeolitic residue is treated to form aluminium chloride, preferably in the form of the aluminium hexahydrate ($AlCl_3.6H_2O$ or ACH). This may be achieved by leaching the zeolitic residue directly with hydrochloric acid or other chloride containing lixiviant solution producing a solid silica enriched by-product and ACH in solution in a single or multi-step chloridising process. Silicon levels in the leach solution should be low enough to avoid gel formation. Preferably, such leaching involves a multi-step acid leaching scheme whether involving hydrochloric acid alone or, in initial stage(s), another acid such as sulphuric acid. An advantageous scheme would involve two acid leaching steps, the first step involving leaching of the zeolitic residue with hydrochloric acid or sulphuric acid. Following a convenient intermediate neutralisation step, conveniently using lime or calcium hydroxide as neutralising agent though sodium hydroxide is a less preferred alternative due to the more likely behaviour of sodium as an impurity, the second acid leaching step proceeds with hydrochloric acid to form an ACH solution. The solids from intermediate neutralisation are desirably separated efficiently, for example in a centrifuge, to limit impurities retained in the solids directed to the second acid leaching step.

Treatment of the zeolitic residue may, if necessary prior to other treatment steps such as those described above, include an initial ion exchange step, for example in which an aqueous solution of a suitable compound such as an ammonium compound, for example ammonium chloride, ammonium sulphate, ammonium nitrate, ammonium hydroxide or ammonium carbonate may be contacted with the zeolitic residue. The ion exchanged zeolitic residue, in this example, may then be heated to remove excess ammonia and adsorbed moisture with ammonia being treated to regenerate the ion exchange solution. Such an ion exchange step may require to be conducted under pressure.

ACH solution from acid leaching, or other ACH production step, is desirably crystallised to recover ACH. To achieve the required ACH purity, a multi-step crystallisation process—conveniently involving two or three ACH crystallisation steps separated by an intermediate re-dissolution step—is desirably conducted to provide a purified ACH intermediate or precursor of high purity for high purity alumina production.

ACH, preferably in purified form as described above, may then be directly calcined at 1000-1600° C., preferably at 1200 to 1300° C., to produce high purity alumina at required specification, for example 99.99% or 4N specification. Preferably, ACH is first roasted at lower temperature, preferably in the range 750-1150° C., to form an amorphous or γ phase alumina before calcination which forms the desired a phase alumina of HPA.

Alternatively to direct calcination which presents a chloride corrosion risk to a calciner, the ACH may be dissolved in water, preferably high purity water (for example deionised water, distilled water, ultrapure water (with >18.5Ω being desirable) or a like purified water stream), neutralized to form boehmite (AlOOH). Neutralisation may involve any convenient alkali; however an ammonium hydroxide or $NH_3/H_2O$ solution is preferred particularly where an ammonium chloride product of neutralisation is saleable. Ammonium chloride may be separated with boehmite formation potentially taking a longer period, for example of 12 to 24 hours. The boehmite is then separated and conveniently roasted to form amorphous or γ-alumina and then calcined to form high purity alumina (α-alumina phase) at the required specification for commercialisation as described above. This may form another embodiment of the invention which provides a process for converting aluminium chloride hexahydrate (ACH) to a phase alumina comprising the steps of:

(a) dissolving ACH in water;

(b) neutralising the ACH solution with an alkaline solution to form boehmite (AlOOH);

(c) separating the boehmite;

(d) roasting the boehmite to form alumina in an amorphous or γ-alumina phase; and (e) calcining the alumina obtained from step (d) to form high purity alumina (α-alumina phase).

Producing a high purity alumina specification for commercialisation may, if necessary, involve washing and milling steps following production of the high purity alumina.

The process described herein enables spodumene ore to be treated to produce final value products including alumina and a lithium salt with other potential final products including a range of zeolites, such as hydroxy sodalite or analcime, in an efficient manner which reduces or avoids waste product production and offers a closed-loop process in which reagents are regenerated and re-used.

BRIEF DESCRIPTION OF THE DRAWINGS

Further features of the process for producing alumina and a lithium salt as described above are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
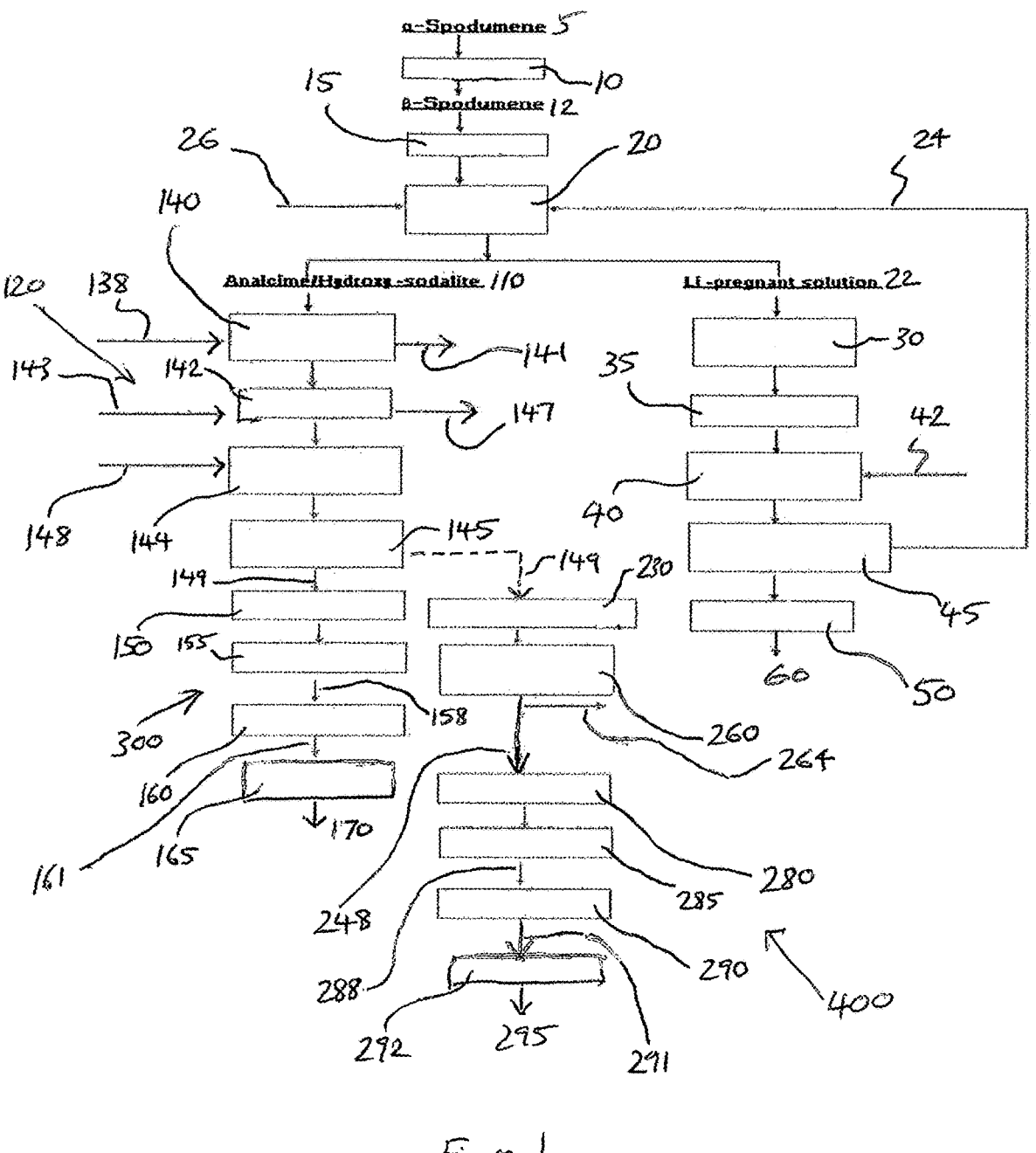
FIG. 1 is a flow diagram for the process for producing alumina and a lithium salt according to a first embodiment of the present invention.
Figure 2:
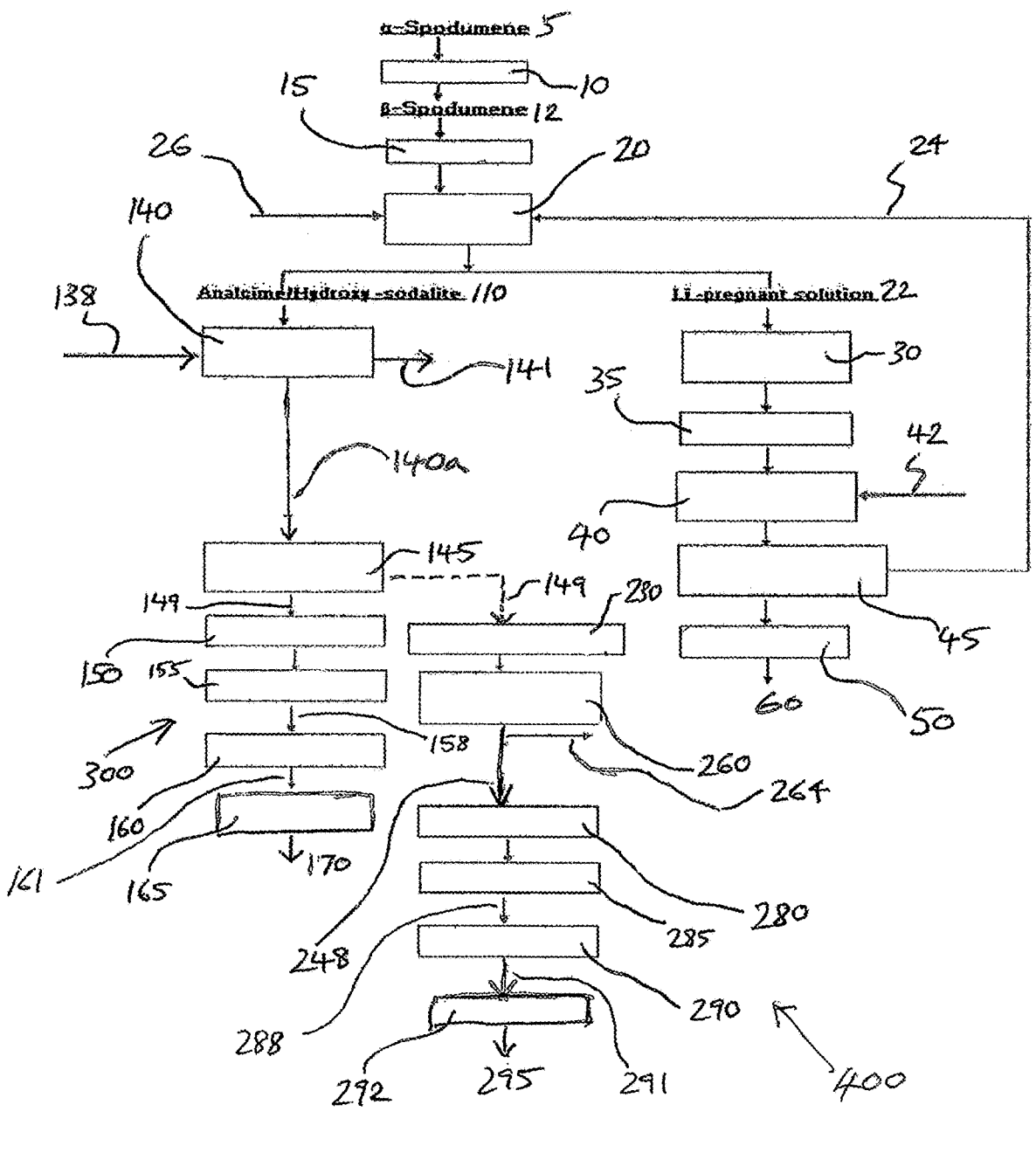
FIG. 2 is a flow diagram for the process for producing alumina and a lithium salt according to a second embodiment of the present invention.

Referring to FIGS. 1 and 2, α-spodumene ore 5 is mined and concentrated and fed to calcination step 10 for conversion to β-spodumene 12, a mineral more amenable to leaching. Calcination step 10, also called roasting, may be conducted in a rotary kiln or flash calciner of type known in the art of lithium extraction at a temperature of between 1000-1100° C. Temperatures above 1400° C. are to be avoided as high temperatures can cause sintering and fusion issues making calcination ineffective.

Following calcination step 10, the β-spodumene 12 is milled in milling step 15 to a selected particle size distribution prior to leaching with an alkaline solution of sodium sulphate, with sodium sulphate and sodium hydroxide in admixture. For example, the selected particle size distribution is 80% passing 53 µm, preferably 38 µm.

Leaching step 20 is conducted under pressure in an agitated autoclave of conventional design. Process conditions, for example, are temperature 190° C., pressure 13 bar, solids density 22% and residence time 3 hours. Sodium sulphate is here used as an input reagent and not as a by-product of a sulphuric acid leach. While a solution of anhydrous sodium sulphate at pH 7 could be used for the leach, higher leach efficiency and lithium extraction can be achieved with an alkaline solution of sodium sulphate. To this end, sodium hydroxide (NaOH) 26 is introduced to the autoclave in admixture with a solution of Glauber's salt ($Na_2SO_4.10H_2O$) which is already in the alkaline range as described below due to the nature of the LiOH conversion step 40, reducing the requirement for NaOH addition and offering a cost advantage. Additional sodium sulphate may be introduced to the autoclave if necessary with stream 26. An alternative is lime addition but this would introduce an impurity element, Ca, to the leach and this would require removal from the pregnant lithium sulphate containing solution 22 produced from leaching prior to production of the target lithium salt, here lithium hydroxide. As an example, the target ratio of β-spodumene:$Na_2SO_4$:NaOH in the leach solution is 1:0.30:0.02 at commencement of leaching.

The reaction scheme for leaching step 20 is:

$$2\beta\text{-LiAlSi}_2O_6(s) + Na_2SO_4(aq) + 2H_2O \rightarrow 2NaAlSi_2O_6.H_2O(s) + Li_2SO_4(aq)$$

The process is an integrated process for producing at least alumina and lithium hydroxide, thus improving the economics of treatment of spodumene ore beyond that achieved by sole production of lithium hydroxide. Thus, the process includes treatment schemes for producing both lithium hydroxide and high purity alumina as described below.

Production of Lithium Hydroxide

Leaching step 20 produces a pregnant lithium sulphate solution (PLS) 22 containing impurities such as iron, magnesium, calcium, silicon, potassium and sodium. The lithium sulphate solution is separated from the leach residue by filtration and subjected to further treatment steps to both produce lithium hydroxide and regenerate sodium sulphate 24 for re-use in leaching step 20.

First, the lithium sulphate solution with a relatively low Li concentration, for example, 7 g/L (though representing 96% recovery of Li from the β-spodumene) is concentrated by evaporation in evaporation step 30 to a target of 10-15 g/L Li. The concentrated lithium sulphate solution is then, following a polishing filtration (not shown), treated in ion exchange step 35 by contacting it with ion exchange resin of suitable type known in the art to remove about 300-400 ppm of the impurity elements described above.

A lithium hydroxide solution is then formed in LiOH conversion step 40 by reacting the lithium sulphate solution with sodium hydroxide 42 to form lithium hydroxide solution and sodium sulphate which is crystallised as sodium sulphate decahydrate (Glauber's salt) in crystallisation step 45 to be recycled for re-use as a leaching solution 24 in leaching step 20 as described above. Such solution is in alkaline pH range, due to the use of sodium hydroxide in the LiOH conversion step 40 and consequential residual presence of sodium hydroxide in the Glauber's salt.

The lithium hydroxide solution is then subjected, in line with conventional practice, to a number of crystallisation steps at crystallisation stage 50 to provide a high purity, lithium hydroxide monohydrate 60 for supply, in one option to LIB battery manufacture.

Production of Aluminium Chloride Hexahydrate as Intermediate in High Purity Alumina Production Leaching step 20, which forms the lithium sulphate solution described above, also produces a zeolitic residue 110 which substantially comprises hydroxy-sodalite and/or analcime though containing impurities. The zeolitic leach residue 110, while having some value, for example in the cement and ceramics industries, is desirably subjected to further treatment steps, as described below, to produce high purity alumina of typically significantly higher value.

The zeolitic residue 110, treated if necessary by ion exchange in manner analogous to that described in Australian Patent Application No. 2018406693 the content of which is hereby incorporated herein by reference, is then subjected to a chloridising process 120, conveniently involving an acid leaching process, with the object of producing an intermediate to high purity alumina production, aluminium trichloride hexahydrate ($AlCl_3.6H_2O$) or ACH. ACH may be produced in a process involving a single step leach of the zeolitic residue with hydrochloric acid or, preferably, in a multi-step process involving hydrochloric acid leach and neutralisation steps. Both modes are described below.

In either mode, the zeolitic residue 110 is re-slurried in hydrochloric acid.

Example 1 Multi-Step Hydrochloric Acid Leach with Intermediate Neutralisation Referring to FIG. 1, a slurry of filtered zeolitic residue 110 from leaching step 20 is directly leached in an agitated tank reactor with hydrochloric acid (HCl) 138 in a primary leach step 140 with process conditions: 10-20% zeolitic residue solids density; dry solid/HCl solution ratio from 1:2.5 to 1:5, temperature: room temperature to 90° C. (though higher temperature would reduce leach time) and residence time 3 hours to 24 hours. The primary leach step 140 produces an aluminium chloride containing solution and a filter cake of silica enriched by-product 141 recovered by filtration and counter-current washed. In an alternative embodiment, the primary leach step 140 could be conducted with sulphuric acid rather than hydrochloric acid.

Leachate from the primary leach step 140 is directed to a neutralisation step 142 involving neutralisation through addition of lime or hydrated lime 143 to an agitated tank reactor. The object of the neutralisation step 142 is to separate aluminium and sodium containing streams. During neutralisation step 142, $Al^{3+}$ precipitates as white aluminium hydroxide $(Al(OH)_3)$ while sodium remains in the leachate as sodium chloride. $Al(OH)_3$ is filtered from the leachate with a conventional filter or centrifuge and repulped and washed three times with deionised water to remove entrained $Na^+$ The liquor from neutralisation step 142 is treated as a waste liquor 147 rich in NaCl and $CaCl_2$). These salts can be recovered by spray drying to generate a low value mixed salt product and water which can be recovered for use as process water. The recovery steps avoid pressure on the environment.

Washed $Al(OH)_3$ is subjected to a secondary HCl leach step 144 in an agitated tank reactor with HCl 148 under process conditions similar to those used for the primary HCl leach step 140. An ACH solution is produced, the ACH being crystallised, re-dissolved and re-crystallised (in a process involving two crystallisation steps) in crystallisation stage 145 to form a pure ACH ready for treatment to produce high purity alumina as described below. Crystallisation of ACH is achieved by saturating the ACH solution with HCl gas through known methods, with the crystallising mixture being kept, at a temperature range of 40-80° C., to afford the best conditions for precipitation due to the exothermic nature of the reaction. The purity of the ACH is increased through two crystallisation steps with ACH from the first crystallisation step being re-dissolved in deionised water or dilute HCl and then re-precipitated through HCl gas saturation and crystallisation under the same conditions as in the first crystallisation step.

Example 2 Single Step Hydrochloric Acid Route to ACH

Alternatively, as shown in FIG. 2, ACH may be produced in a single hydrochloric acid leach step 140, in this example by reacting zeolitic residue 110 with HCl 138 in a solution containing 32 g/L Al at an Al recovery of 85%. Process conditions, for example, involve 36 wt % HCl at room temperature and reaction duration one hour at a solids density of 10% to 25%. Agitated tank reactor(s) are employed. At higher HCl concentrations, the solubility of ACH is reduced. At lower HCl concentrations, extraction may also be successful, although copious quantities of HCl will be needed to saturate the ACH solution to precipitate the ACH out. Extraction may also occur at lower temperatures, for example at room temperature.

The hydrochloric acid leach step of the single step process only requires hydrochloric acid in slight excess to stoichiometric amounts for reaction to form ACH. That is, just over 3 mole equivalents of HCl for every one mole equivalent of aluminium in the residue. Acid leachate 140a is separated from the silica rich acid leached residue 141 by filtration or centrifugation with both solid and liquid components being subjected to further processing steps.

To precipitate ACH from the acid leachate from acid leaching step 140, the leachate is saturated—in crystallisation stage 145—with HCl gas through known methods and the mixture kept cool to afford the best conditions for precipitation due to the exothermic nature of the reaction. The purity of the ACH is improved by redissolution with water or dilute HCl and re-precipitation with HCl gas until the desired ACH purity is reached. Three crystallisation stages are used in this example rather than the two crystallisation stages of Example 1. Washing of the product with 36% HCl could be included, if proven to be desirable.

Production of High Purity Alumina

The purified aluminium chloride hexahydrate (ACH) 149, whether produced as described for Example 1 or 2, may then, in a first process 300, be roasted in roasting step 150 followed by calcining step 155 to produce high purity alumina (HPA, α-alumina) 158 which is then washed in washing step 160 and milled in milling step 165 to produce HPA 170 of the required specification for commercialisation, typically a minimum purity level of 99.99% or 4N. Washing step 160 involves washing with ultrapure water (>18.5Ω), with three washing steps being conducted, to remove any remaining contaminants, such as alkaline metals introduced during the roasting or calcining steps 150 and 155. Washed HPA 161 is filtered and dried and milled in milling step 165 to required size, for example 1 μm. Product HPA 170 is then packaged and sold.

In roasting step 150, the ACH crystals decompose to amorphous or γ-alumina and HCl gas at relatively lower temperature. HCl gas would be recycled to the crystallisation stage 145. Chloride is believed to be a threat to any calciner due to its corrosion properties, especially at high temperatures of over 1100° C. Therefore, it is essential to remove as much chloride as possible during the roasting step 150 and make a low chloride alumina for the calcination process. Calcination of roasted alumina (amorphous or γ-alumina) would produce HPA which is an α-phase alumina.

For roasting ACH, a stationary furnace is used in this embodiment though other techniques such as spray roasting using a vertical furnace (of the kind, for example, of acid recovery reactors utilised in acid regeneration steps in steelmaking) may be used, the furnace being equipped with an exhaust system for removal of HCl gas and water generated from the ACH decomposition reaction at high temperatures. HCl was not recovered though this is an option in other embodiments. During the roasting, the ACH crystals were loaded into a crucible made from fused silica and slowly heated to 700° C., maintaining this temperature for 1 hour. The roasted alumina was then calcined at 1250° C. for 1 hour to enable completion of α phase conversion from amorphous alumina.

As alluded to above, the presence of chloride is a threat to a calciner due to its corrosion properties. To address this, HPA may be produced from purified ACH 149 by an alternative process 400 as indicated by dashed line 149, though stream splitting so that some ACH 149 is subjected to HPA production process 300 and some ACH 149 is subjected to HPA production process 400 is possible, in which the purified ACH 149 is first dissolved in dissolution stage 230 with ultrapure water to achieve a 1 M Al concentration with continuous stirring. The solution is then heated to 100° C.

Ammonium hydroxide solution is then added in neutralisation stage 260 to neutralise the ACH containing liquor with a target pH of 5 to 8 to initially precipitate ammonium chloride 264, which is separated and potentially saleable, and ultimately form boehmite (AlOOH). Formation of boehmite may take 12 to 24 hours stirring. The boehmite 248 is separated, for example by filtration, washed and dried. Boehmite 248 is then heated to 500° C. in roasting step 280 to form amorphous or γ-alumina which is then calcined in calcining step 285 at temperature 1250° C. for one hour to form HPA being α phase alumina 288.

HPA 288 is then washed in washing step 290 and milled in milling step 292 to produce HPA 295 of the required specification for commercialisation, typically a minimum purity level of 99.99% or 4N. Washing step 290 involves washing with ultrapure water (>18.5Ω), with three washing steps being conducted, to remove any remaining contaminants, such as alkaline metals introduced during the roasting or calcining steps 280 and 285 Washed HPA 291 is filtered and dried and milled in milling step 292 to required size, for example 1 μm. Washed HPA 291 is filtered and dried and milled in milling step 292 to required size, for example 1 μm. Product HPA 295 is then packaged and sold.

The process as described herein has significant potential for increasing profitability of lithium extraction operations by integrating production of lithium salts and high purity alumina. At the same time, further commercial benefits can be achieved by recycling reagents to minimise cost and substantially eliminate waste.

Modifications and variations to the process for producing alumina and a lithium salt described herein may be apparent to the skilled reader of this disclosure. Such modifications and variations are considered within the scope of the present invention.

Throughout this specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A process for producing alumina and a lithium salt comprising the steps of:
   (a) calcining an alpha spodumene ore or concentrate to produce beta spodumene; and
   (b) (I) leaching the beta spodumene from the calcining step (a) with an alkaline solution under pressure; or
      (II) sulphating the beta spodumene with at least sodium sulphate to produce sulphated beta spodumene and leaching said sulphated beta spodumene,
   to produce a lithium containing solution and a zeolitic residue wherein said lithium containing solution is treated to provide a purified lithium salt and said zeolitic residue is treated to provide alumina,
   wherein said zeolitic residue is treated by the following steps:
   (i) acid leaching said zeolitic residue with an acid selected from the group consisting of hydrochloric acid and sulphuric acid,
   (ii) intermediate neutralisation;
   (iii) acid leaching involving hydrochloric acid to form an aluminum chloride hexahydrate (ACH) solution; and (iv) treating said ACH solution to provide α-phase alumina.

2. The process of claim 1, wherein said alkaline solution is selected from an alkalised sodium sulphate solution and Glauber's salt solution.

3. The process of claim 2, wherein said alkaline solution further includes NaOH.

4. The process of claim 1, wherein the leaching of the step (b) is conducted under the following conditions:
   (a) pressure in the range of 5-45 bar;
   (b) temperature in the range of 100-300° C.;
   (c) solids density in the range of 10-30%; and
   (d) residence time in the range of 2-12 hours.

5. The process of claim 1, comprising sulphating the beta spodumene with solid sodium sulphate to produce solid lithium sulphate which is then leached into lithium sulphate solution by an aqueous solution.

6. The process of claim 5, wherein sodium sulphate is regenerated by contacting the lithium sulphate leaching solution with sodium hydroxide to produce a lithium hydroxide solution and the sodium sulphate.

7. The process of claim 6, wherein the sodium sulphate is crystallised and dissolved in water or alkaline solution to be re-used in the leaching of the step (b), said sodium sulphate being crystallised as Glauber's salt ($NaSO_4.10H_2O$), dissolved in water to form an alkaline solution, and re-used in the leaching of the step (b).

8. The process of claim 1, comprising crystallising ACH from the ACH solution.

9. The process of claim 8, wherein treating stop (iv) comprises:
   (a) dissolving the ACH in water;
   (b) neutralising the ACH solution with an alkaline solution to form boehmite (AlOOH);
   (c) separating the boehmite;
   (d) roasting the boehmite to form amorphous alumina or γ-alumina; and
   (e) calcining the amorphous alumina or γ-alumina obtained from the step (d) to form α-phase alumina.

10. The process of claim 9, wherein said alkaline solution of neutralising step (b) is ammonium hydroxide or $NH_3/H_2O$ solution.

11. The process of claim 10, wherein ammonium chloride is separated prior to formation of the boehmite.

12. The process of claim 8, wherein the ACH is directly calcined at temperature 700 to 1600° C. to form the α-phrase alumina.

13. The process of claim 8, wherein the ACH is initially roasted to form amorphous or γ-phase alumina which is then calcined at temperature 1100 to 1600° C. to form the α-phrase alumina.

14. The process of claim 1, comprising leaching the zeolitic residue directly with hydrochloric acid or other chloride containing lixiviant solution producing a solid silica enriched by-product and ACH in solution in a single or multi-step chloridising process.

15. The process of claim 14, wherein the intermediate neutralisation is with lime or calcium hydroxide.

16. A process for producing alumina and a lithium salt comprising the steps of:
   (a) calcining an alpha spodumene ore or concentrate to produce beta spodumene; and
   (b) (I) leaching the beta spodumene from the calcining step (a) with an alkaline sodium sulphate solution under pressure to produce a lithium sulphate containing solution and a zeolitic residue; or (II) sulphating the beta spodumene with at least sodium sulphate to produce sulphated beta spodumene and leaching said sulphated beta spodumene to produce a lithium sulphate containing solution and a zeolitic residue, treating said lithium sulphate containing solution to provide a purified lithium salt, wherein said zeolitic residue is separated from the lithium sulphate containing solution and treated to provide α-phase alumina by the following sequence of steps:

(i) acid leaching the zeolitic residue to form a silica enriched solid by product and an aluminum containing solution containing impurities including sodium introduced by step (b);

(ii) neutralising the aluminum containing solution by intermediate neutralisation to precipitate an aluminum hydroxide and form a waste solution containing sodium;

(iii) separating the aluminum hydroxide from the waste solution containing sodium thus separating the aluminum hydroxide from the waste solution containing sodium;

(iv) leaching the aluminum hydroxide with hydrochloric acid to form an aluminium chloride solution;

(v) precipitating aluminum chloride in the form of crystallised aluminum chloride hexahydrate (ACH) from the aluminum chloride solution of step (iv); and (vi) treating said crystallised ACH to provide the α-phase alumina; and wherein sodium sulphate is regenerated by contacting the lithium sulphate containing solution with sodium hydroxide to produce a lithium hydroxide solution and sodium sulphate, the regenerated sodium sulphate being re-used in step (b).

17. The process of claim 16, comprising washing the aluminum hydroxide of step (iii) to remove entrained sodium.

18. The process of claim 16, comprising separating the aluminum hydroxide from the waste solution containing sodium by centrifugation.

19. The process of claim 16, wherein said silica enriched solid by product is treated to recover silica.

20. The process of claim 16, wherein said waste solution containing sodium is spray dried to generate a mixed salt product containing sodium chloride and calcium chloride; and water, said water being recovered as process water.

* * * * *